Aug. 11, 1970  E. R. HOMINS  3,523,314
BEEHIVE OPENING ARRANGEMENT
Filed April 15, 1968  2 Sheets-Sheet 1

Inventor
Edmond R. Homins
By Richard W. Carpenter
Attorney

Aug. 11, 1970  E. R. HOMINS  3,523,314
BEEHIVE OPENING ARRANGEMENT
Filed April 15, 1968  2 Sheets-Sheet 2
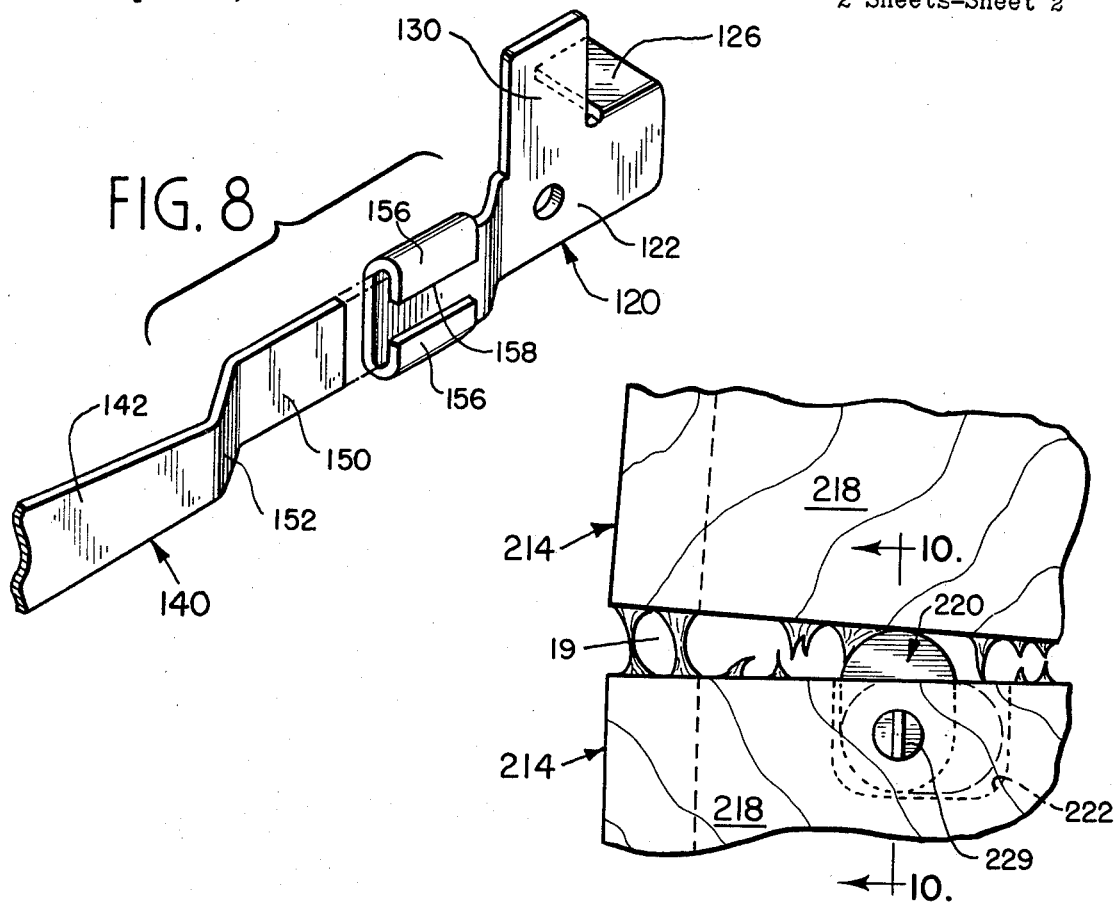
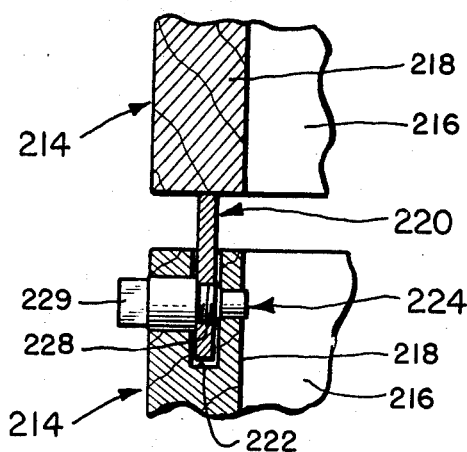
Inventor
Edmond R. Homins
By Richard W. Carpenter
Attorney United States Patent Office 3,523,314
Patented Aug. 11, 1970

3,523,314
BEEHIVE OPENING ARRANGEMENT
Edmond R. Homins, 526 Lyman Ave.,
Des Plaines, Ill. 60018
Filed Apr. 15, 1968, Ser. No. 721,478
Int. Cl. A01k 51/00
U.S. Cl. 6—12                                    10 Claims

ABSTRACT OF THE DISCLOSURE

A device for separating adjacent sections of a beehive comprising a body rotatably mounted on one section near another section and having a portion, engageable with the other section, operable to urge the sections apart as the body is rotated.

---

This invention relates to improvements in beehive tools and fixtures, and more particularly to a device for separating adjacent sections or supers of a beehive which have become adhered together by propolis, a glue-like substance produced and deposited between abutting edges or surfaces of adjacent beehive supers by the bees housed therein.

The problem of separating beehive supers adhered together by propolis has long been a problem to beekeepers, because propolis is so tenacious that a considerable amount of force is required to separate beehive supers which have been coated with this substance.

Ordinarily, it is necessary to utilize crow bars, hammers and other tools to separate adhered supers, and in the course of such effort much damage can be done to the supers themselves. Also, any appreciable amount of hammering and/or prying will generally disturb the bees housed within the hive.

In the past, some intricate and awkward propolis breaking or hive separating tools have been devised. None of these has proven successful, however, because they are expensive or are difficult to carry and/or operate by a beehive tender who normally has his hands full of other equipment essential to the handling and care of beehives.

It is therefore a primary object of this invention to provide an economical device of simple construction and operation which may be affixed to a beehive super and which may be actuated by a lever, such as a conventional hive tool, to pry the super apart from an adjacent super.

A more specific object of the invention is the provision of a separator device having a body rotatably mounted on one beehive super adjacent another super and including a portion engageable with the other super for forcing the adjacent supers apart as the body is rotated, and also including another portion engageable with a tool for rotating said body.

These and other objects of the invention will be apparent from an examination of the following description and drawings, wherein:

FIG. 8 is a perspective view of a tool and separator device illustrating a modified form of the invention; and FIGS. 9 and 10 are views similar to those of FIGS. 5 and 4, respectively, but illustrating yet another modified form of the invention.

It will be understood that, for purposes of clarity, certain elements have been intentionally omitted from certain views where they are illustrated to better advantage in other views.

Figure 1:
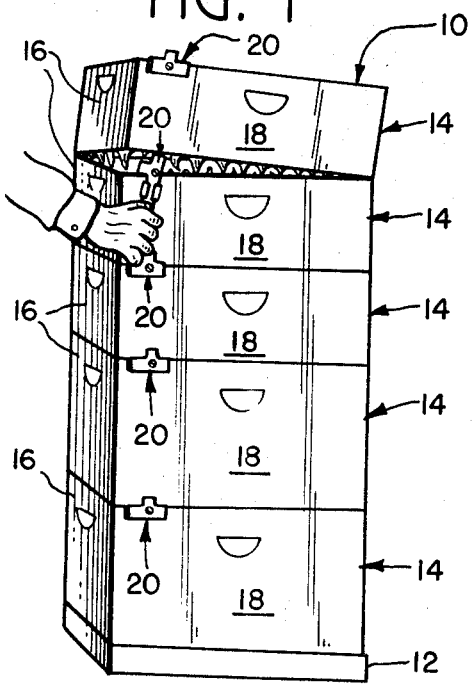
FIG. 1 is a perspective view of a beehive having a device embodying features of the invention.
Figure 2:
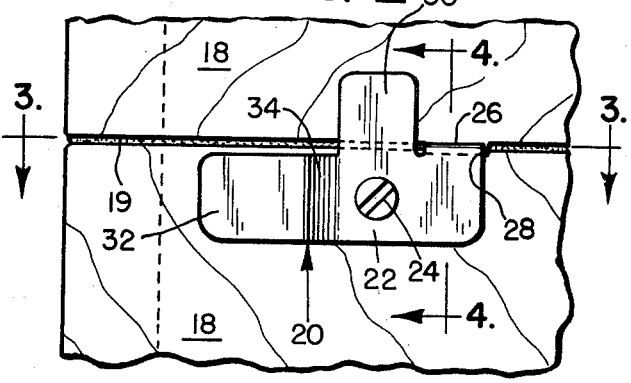
FIG. 2 is an enlarged side elevation of a portion of the structure of FIG. 1.
Figure 3:
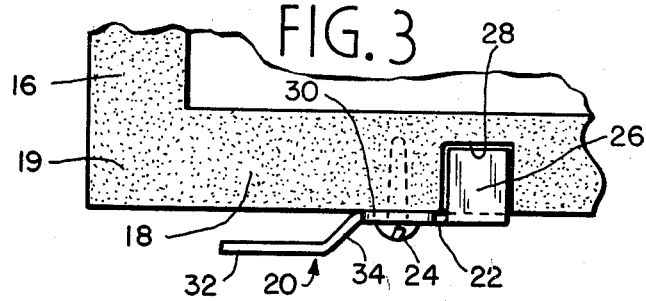
FIG. 3 is a horizontal section taken on line 3—3 of FIG. 2.
Figure 4:
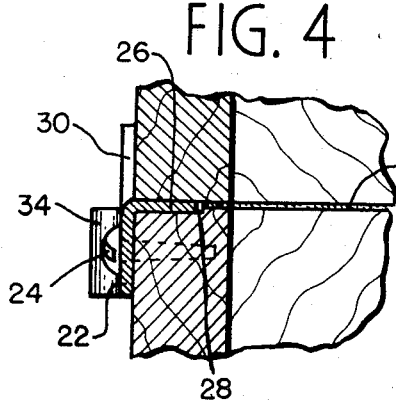
FIG. 4 is a vertical section taken on line 4—4 of FIG. 2.

Referring now to the drawings for a better understanding of the invention it will be seen that a beehive having opening or separator devices embodying features of the invention is illustrated in FIG. 1. The hive, indicated generally at 10, includes a base or stand 12 on which are stacked a plurality of hive sections or supers 14 in which the honey combs are maintained. Each of the supers includes opposed pairs of end and side walls 16 and 18, respectively, which are interconnected at the corners of the super to form a box-like structure.

Figure 5:
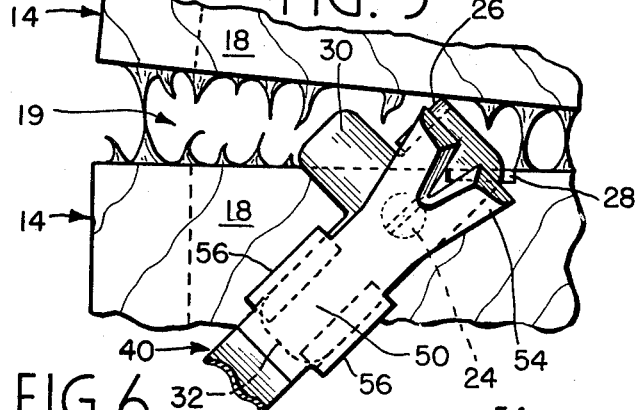
FIG. 5 is a view similar to FIG. 2, but illustrating the structure after the supers have been partially separated from each other.

As the bees colonize a beehive the workers collect a resinous material from trees and bushes which is used as a cement, known as propolis, for caulking the cracks or spaces between the supers, as illustrated at 19 in FIG. 5. Propolis is such an extremely tenacious material, that it binds the adjacent supers together so that it is extremely difficult to separate them.

The essential feature of this invention resides in the provision of a self-contained super separator or propolis breaker device indicated generally at 20. These devices are attached, preferably, in pairs, to opposite side walls of each super at corresponding ends of the side walls.

Each separator device includes a vertically disposed, relatively thin main plate 22 which is rotatably mounted on the outside surface of a side wall of one super, just below an adjacent super in the hive, by means of a screw or bolt 24.

Projecting inwardly from the upper edge of the front end of main plate 22, at a right angle thereto, is a horizontally disposed lift arm or bar 26 which is interposed between abutting surfaces of the side walls of adjacent supers. Preferably the upper edge of the side wall of the super to which the device is pivotally attached is notched, as at 28, to provide a recess for receiving the lift arm so there is no space between the side walls when the supers are in normal stacked position and the device is in inoperative position.

In order to facilitate alignment of adjacent supers for stacking, the body main plate 22 may be provided with an integrally formed, upwardly projecting stacking plate or bar 30.

At its opposite end from lift arm 26, main plate 22 is provided with an elongated extension or actuating portion 32 which is preferably offset outwardly therefrom and connected thereto by an integral connecting portion 34. The actuating portion is adapted to be engaged by a separate lever or hive tool, so the device can easily be rotated. As the device is rotated in a counter-clockwise direction, as seen in FIG. 5, lift arm 26 engages the underside of the side wall of the upper super and urges the supers apart by breaking the propolis bond that binds adjacent supers together. The upper super may then be lifted off the hive and the process repeated for the next super.

Figure 6:
FIGS. 6 and 7 are plan and side elevations, respectively, of a composite hive tool related to the invention.
Figure 7:
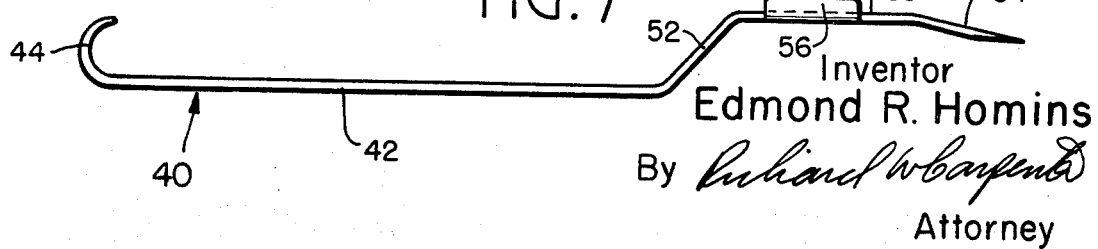

Rotation of the device is achieved by a novel hive tool, shown in FIGS. 6 and 7, which is a composite hive tool adapted for various uses.

The hive tool, indicated generally at 40, includes an elongated body or handle portion 42 having a scraper 44 formed integrally on one end thereof. Located inwardly from the end is an elongated slot 46, the purpose of which is described later in the specification in connection with an alternate embodiment of the invention.

At its opposite end tool 40 includes an actuating portion 52. At the extreme opposite end of the tool it may be provided within nail pulling claws 54.

Actuating portion 50 includes a pair of inturned flanges 56 which define a channel 58 adapted to receive and engage the complementary actuating portion 32 of separator device 20.

Thus, to separate adjacent supers an operator can use the all purpose hive tool to rotate the two devices on each side of a super, without having to carry an additional tool for this operation.

Turning now to FIG. 8 of the drawings it will be seen that a modified form of the invention is shown.

This embodiment operates in the same way as the previously described embodiment except that the structures of the actuating portions 132 and 150 of the separator device 120 and hive tool, respectively, are reversed with the actuating portion 132 of the device being straight and the actuating portion 150 of the tool being provided with flanges 156 which form a channel 158 for receiving the actuating portion of the device. Other portions of the separator device and hive tool are similar to related portions of the separator device and hive tool of the first embodiment and have been designated by corresponding numerals.

Now turning to FIGS. 9 and 10, it will be seen that another modification of the invention is shown.

In this embodiment the separator device is in the form of an eccentric or cam plate 220 which is positioned within a slot or cavity 222 in the super side wall 218 and is pivoted to the side wall on a shaft or bolt 224 disposed to extend through a hold 226 in cam plate 220 and threadably connected thereto as at 228. Projecting outwardly on the bolt 224 is a head or boss 229 contained to fit within slot 46 in the hive tool body.

This embodiment operates in the same manner as the previously described embodiments. The hive tool is attached to the head 229 of the plate bolt 224 and the cam plate 220 is rotated to urge the supers apart.

In each embodiment the separator device is a relatively inexpensive, one-piece unit which may be readily attached to a super and easily operated by an all-purpose hive tool to separate bonded supers with a minimum amount of effort and without damaging the supers or disturbing the bees within.

I claim:

1. A device for separating from each other abutting horizontal surfaces of adjacent supers of a beehive, comprising:
   (a) A body mounted, relative to a vertical wall of one super near a co-planar vertical wall of another adjacent super, for rotation about an axis lying normal to said walls and parallel to said surfaces;
   (b) Said body including a portion engageable with the surface of said other super and operable to urge the surfaces of the respective supers away from each other as said body is rotated about said axis;
   (c) Said body including another portion adapted for engagement with a lever for rotating said body about said axis.

2. A device according to claim 1, wherein said body includes:
   (a) A main plate pivotally mounted on the outside of the wall of said one super;
   (b) A lift arm extending horizontally inward from one end of said main plate between said surfaces;
   (c) An extension on the opposite end of said arm arranged and disposed for engagement with a lever.

3. A device according to claim 2, wherein one of said surfaces is recessed to receive said lift arm when said device is in an inoperative position.

4. A device according to claim 2, and including a vertical plate formed integrally with and extending upwardly from said main plate for engagement with the side wall of said other super to maintain the walls of said supers in alignment with each other.

5. A device according to claim 1, wherein said other portion of said body includes a pair of flanges forming a channel for receiving said lever.

6. A device according to claim 1, wherein said body comprises a cam plate eccentrically mounted within an opening in the wall of said one super.

7. A device according to claim 6, wherein said one portion of said body is moveable out of said opening, upon the rotation of said body, for engagement with the surface of said other super.

8. A device according to claim 1, wherein said other portion of said body includes a boss adapted to be received within a complementary aperture in said lever.

9. A device according to claim 1, wherein said lever comprises a hive tool having, adjacent one end thereof, a pair of flanges defining a channel for receiving said other portion of said body.

10. A device according to claim 1, wherein said lever comprises a hive tool having, adjacent one end thereof, an aperture adapted to receive a complementary boss of said body.

References Cited

UNITED STATES PATENTS

| | | | |
|---|---|---|---|
| 1,448,609 | 3/1923 | Waggoner | 6—12 |
| 1,559,868 | 11/1925 | Hall | 6—12 |
| 2,369,815 | 2/1945 | Coakley | 6—12 |
| 2,593,304 | 4/1952 | Howard | 6—12 |

FOREIGN PATENTS

| | | |
|---|---|---|
| 71,970 | 3/1953 | Netherlands. |

LUCIE H. LAUDENSLAGER, Primary Examiner